Oct. 31, 1933. H. E. BALSIGER Re. 18,986

SAFETY DEVICE FOR GRINDING MACHINES

Original Filed June 13, 1928 2 Sheets-Sheet 1

INVENTOR.
HAROLD E. BALSIGER.
BY
ATTORNEYS.

Oct. 31, 1933. H. E. BALSIGER Re. 18,986

SAFETY DEVICE FOR GRINDING MACHINES

Original Filed June 13, 1928 2 Sheets-Sheet 2

INVENTOR.
HAROLD E. BALSIGER.
BY
ATTORNEYS.

Reissued Oct. 31, 1933

Re. 18,986

UNITED STATES PATENT OFFICE 18,986

SAFETY DEVICE FOR GRINDING MACHINES

Harold E. Balsiger, Waynesboro, Pa., assignor to Landis Tool Company, Waynesboro, Pa., a corporation of Pennsylvania Original No. 1,826,445, dated October 6, 1931, Serial No. 285,113, June 13, 1928. Application for reissue February 18, 1932. Serial No. 594,652

21 Claims. (Cl. 51—233)

This invention relates to safety devices for use with a hydraulically operated work rest on grinding machines, and particularly crank grinding machines.

It is an object of the invention to provide safety means whereby the work carriage on the grinding machine cannot be traversed while the work rest is in position to support the work.

A further object is to provide in a safety combination of the above character, an automatic pressure operated fluid by-pass valve.

A further general object is to provide a safety device in grinding machines or the like which will require as little attention from an operator as possible without danger of injury to the machine.

A further object is to provide means to interlock the movements of two or more parts of a machine tool.

Further objects and advantages will become apparent as the description proceeds.

Figure 1:
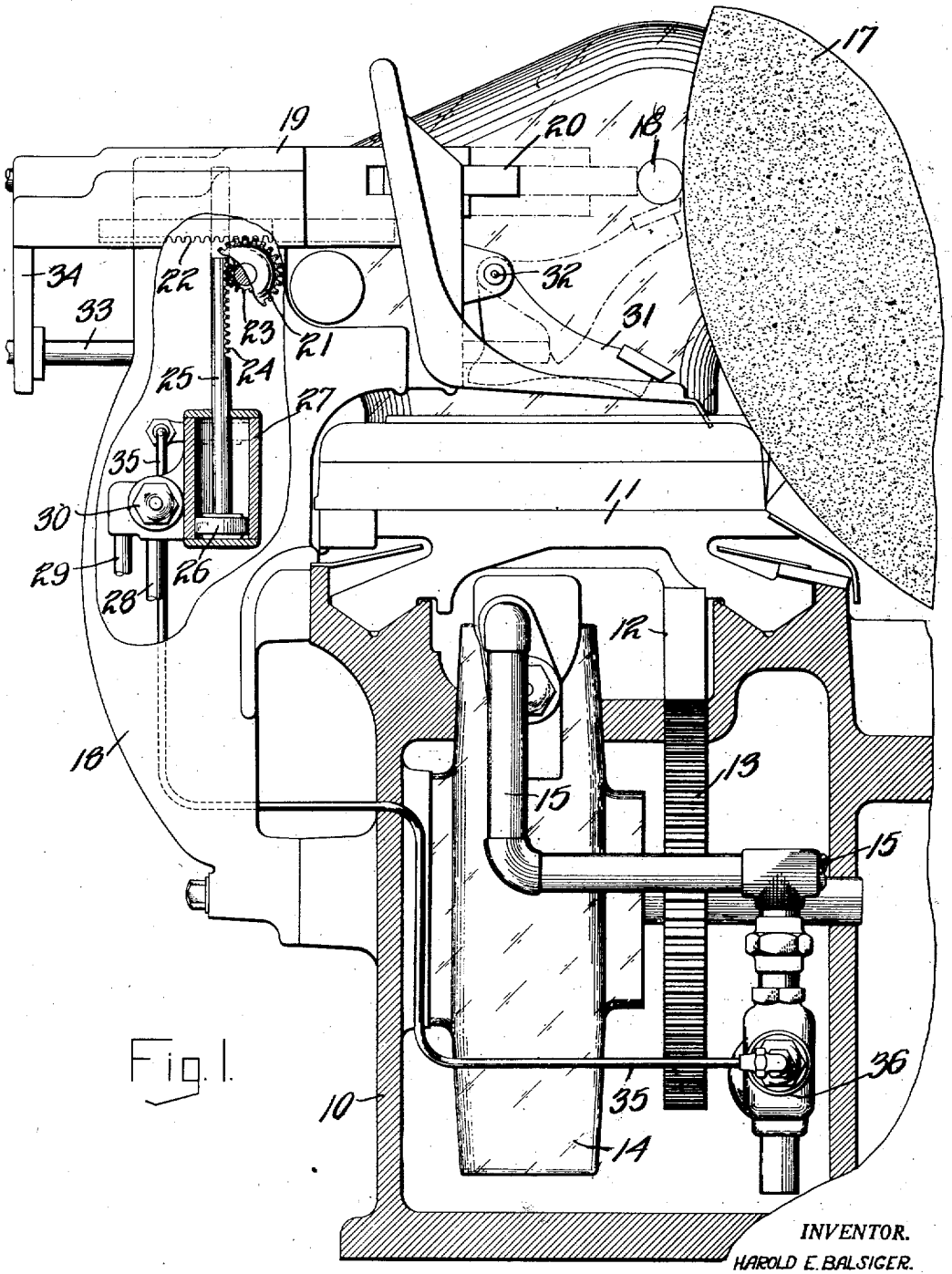
Figure 2:
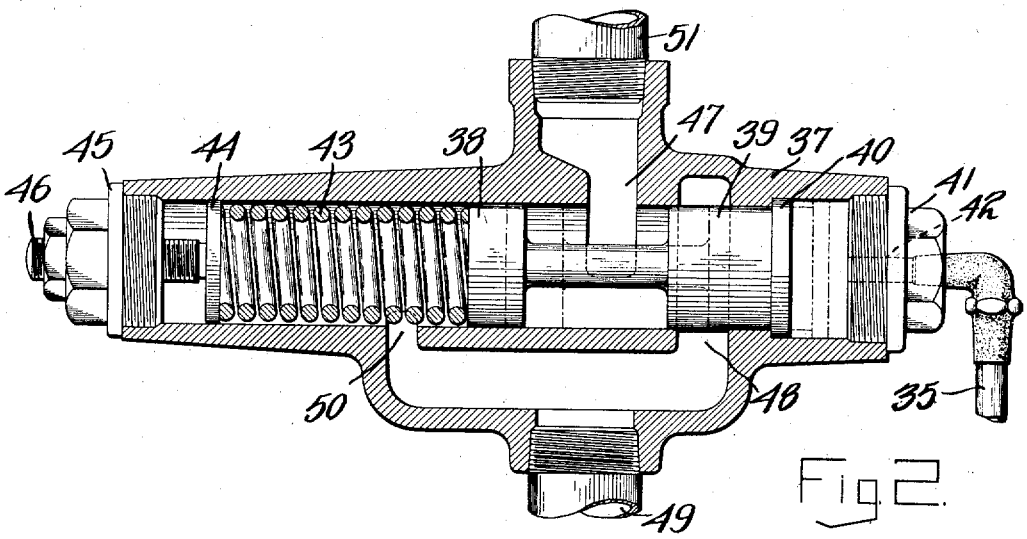
Figure 3:
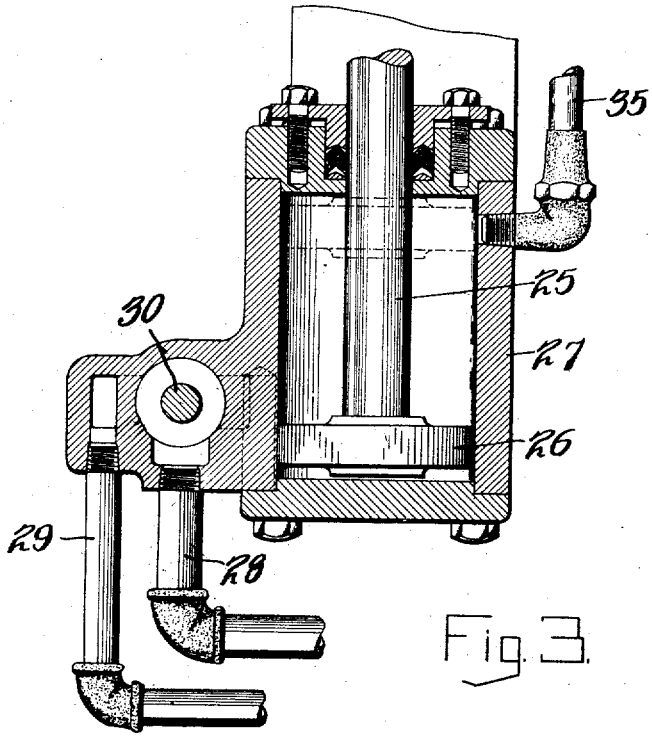

Referring to the accompanying drawings, which are made a part hereof and on which similar reference characters indicate similar parts, Figure 1 is a partial end elevation, partly in section, of a crank grinder equipped with a stationary hydraulic back rest, and showing the safety device in its relation to the grinder, Figure 2 is a sectional front elevation of the by-pass valve, and Figure 3 is a sectional elevation of the piston which operates the work rest.

The crank grinding machine of which my invention is here shown as forming a part, is the machine described in a patent of Amos P. Steiner, Paul Stoner and Charles P. Harrison No. 1,816,750, granted July 28, 1931 for Crank grinding machines and the back rest is that described in the patent to Amos P. Steiner and Harold E. Balsiger, No. 1,867,112, granted July 12, 1932 for Hydraulic back rests for grinding machines. The grinding machine and the back rest will therefore be described only insofar as is necessary to understand the application of the control device to these machines.

In the drawings numeral 10 indicates the base of a grinding machine having a traversable carriage 11 slidably mounted in suitable guideways thereon. The traverse carriage is reciprocated by means of a rack 12 mounted thereunder, which is driven by a suitable pinion 13 which pinion is operated by means of an oscillating motor 14. The motor is driven by pressure fluid delivered thereto through a pipe 15. The work 16 is mounted in a well known way upon the traverse carriage in position to be moved to grinding position before an abrasive wheel 17. The work rest consists of a back rest bracket 18, secured upon the base of the machine. A slidable member 19 carrying a work engaging jaw 20 is moved toward and from working position by means of a pinion 21 engaging the rack teeth 22 on the lower part of the slide 19. A small pinion 23 is connected to the large pinion 21 and is driven by means of rack teeth 24 on a piston rod 25. The piston rod carries on its lower end a piston 26 which moves in a cylinder 27. Pipes 28 and 29 provide inlet and outlet passages to the cylinder 27. A reversing valve 30 admits pressure fluid selectively below or above the piston 26 to move the work engaging jaw to operative position, or withdraw it from operative position. A lower work engaging jaw 31 is pivoted at 32 and is moved to operative position by means of a plunger 33 which is connected to a plate 34 secured to the back rest slide 19. The details of the reversing valve 30 have not been shown because any conventional structure for admitting fluid above and below piston 26 and for exhausting fluid from the cylinder 27 may be used.

Connected with a chamber above the piston 26 in the cylinder 27 is a pipe 35. This pipe connects with a by-pass valve shown as a whole at 36, and which forms the control or safety feature of the invention. The details of this valve will now be described:

The valve comprises a valve casing 37 having a double piston 38 and 39 reciprocably mounted in a bore therein. The piston 39 is longer than the piston 38, and is provided with a flange 40 which engages a shoulder in the cylinder valve body to limit the movement of the valve in one direction. A cap 41 is screwed into the end of the valve casing and has a hole 42 therethrough, into which is threaded a connection on the pipe 35. A spring 43 positioned between one end of the piston 38 and a disc 44 exerts pressure upon the valve piston to force it to the right as shown in Figure 2. A cap 45 closes one end of the bore in the casing 37. This cap has an adjusting screw 46 threaded therethrough and engaging the disc 44 to provide means for adjusting the tension of the spring 43. The valve casing is provided with an inlet port 47 and a discharge port 48. A pipe 49 connects the discharge port with suitable connections leading to the reservoir in the base of the grinding machine, not shown. A relief port 50 provides for leakage of fluid past the piston 38. The port 47 is connected by means of a short pipe 51 with the pipe 15 which supplies motive fluid to the oscillating motor 14. The tension of the spring 43 is such that it requires greater pressure to operate the by-pass valve than the work rest. The valve will therefore not be operated while the back rest is being withdrawn, nor until the piston has reached its lowermost position.

The operation of the device is as follows:

When the piston 26 is in the position shown in full lines in Figure 1, the chamber above the piston is open to the high pressure fluid line 28. The pipe 35 in communication with the high pressure fluid chamber delivers pressure through the passage 42 against the end of the piston 39 to force it to the left, as shown in Figure 2, against the tension of the spring 43. This holds the plunger in the position shown in full lines in Figure 2, and closes communication between the ports 47 and 48. High pressure fluid in the pipe line 15 will therefore be delivered to the oscillating motor 14 to drive the traversing carriage 11. When, however, the reversing valve 30 has been moved to admit high pressure fluid below the piston 26 and to exhaust it above the piston 26, the piston will be moved upward to move the back rest to operative position in engagement with the work 16, as shown in dotted lines in Figure 1. When the reversing valve is in this position, pressure fluid is allowed to exhaust through the reversing valve 30 to the pipe 29. The shifting of the reversing valve relieves pressure at the right of the flange 40 on the piston 39 and allows the spring 43 to move the piston to the position shown in dotted lines in Figure 2. High pressure fluid from the pressure lines 15 will then escape through the pipe 51, the ports 47, 48 and outlet passage 49, to a reservoir in the base of the machine. This relieves the pressure in the pipe line 15 and renders the traversing motor 14 inoperative. This provides a safety against accidental attempts to traverse the work carriage while the stationary back rest is in a position to support the work. The advantages of the device in contributing a step toward making a machine more nearly fool-proof should be apparent.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new, and desire to secure by Letters Patent, is:

1. In combination, a grinding machine, a work carriage on said machine, an abrasive wheel, a work rest adapted to support the work against the pressure of the abrasive wheel, means for reciprocating the work carriage, means for moving the work rest to and from operative position, and means controlled by the movement of said work rest to render the said carriage reciprocating means operative or inoperative, substantially as set forth.

2. In a grinding machine having a hydraulically operated work rest and a hydraulically traversed work carriage, means for traversing the work carriage, and means controlled by movement of the work rest for rendering the said traversing means operative or inoperative, substantially as set forth.

3. In a grinding machine a work carriage, a fluid motor for driving said carriage, a high pressure fluid line to said motor, a pressure operated by-pass in said fluid line, a fluid operated back rest movable into and out of operative position, and means for opening said by-pass when said work rest is in operative work engaging position, substantially as set forth.

4. In a grinding machine a work carriage, a motor for traversing said carriage, a high pressure motive fluid line connected to said motor, a by-pass valve in said line, a work rest, hydraulic means for moving said back rest into and out of operative position, and connections from said hydraulic means to said by-pass whereby said by-pass will be opened when said work rest is in operative work engaging position, substantially as set forth.

5. In combination a grinding machine having a hydraulically operated work rest, a hydraulic carriage traverse, and interconnected means to prevent traversal of the work carriage when the work rest is either in motion or is in operative position, substantially as set forth.

6. In combination a grinding machine, a hydraulically operated carriage traverse, a source of pressure fluid, a by-pass valve in the pressure line between said traverse operating means and said source of pressure, a work rest, a fluid pressure operated piston for operating the work rest, fluid connection from said work rest to said by-pass valve whereby said by-pass will open when the pressure is released on one side of the piston, substantially as set forth.

7. In combination, a grinding machine hydraulically operated carriage traverse, a source of pressure fluid, a by-pass valve in the pressure line between said traverse operating means and said source of pressure, a work rest, a fluid pressure operated piston for operating the work rest, fluid connection from said work rest to said by-pass valve, whereby said by-pass will close when pressure is exerted on one side of the piston, substantially as set forth.

8. In a grinding machine a hydraulically operated work rest, a hydraulically operated carriage traversing mechanism, a high pressure fluid line from a source of pressure fluid for operating the said work rest and the said traversing mechanism, a by-pass valve in said high pressure fluid line, a connection between the said work rest and the said valve whereby pressure fluid is directed to the carriage traversing mechanism or is by-passed from the high pressure fluid line depending on the position of the work rest, substantially as set forth.

9. In a grinding machine, a work carriage, a grinding wheel, a fluid motor for reciprocating said carriage, another fluid operated mechanism, a fluid operated valve for by-passing fluid from said motor, and means operative upon movement of said fluid operated mechanism to inoperative position for closing said valve to render said carriage driving means operative, substantially as set forth.

10. In a grinding machine having a hydraulically operated mechanism and a hydraulically traversed work carriage, a motor for traversing the work carriage, a valve in control of pressure fluid to said motor and means controlled by movement of the hydraulically operated mechanism for by-passing pressure fluid around said motor for rendering the said traversing means operative or inoperative, substantially as set forth.

11. In a grinding machine, a work carriage, a fluid motor for driving said carriage, a high pressure fluid line for supplying motive fluid to said motor, a pressure operated by-pass in said fluid line, a fluid operated mechanism movable into and out of operative position, and fluid pressure means for opening said by-pass when said fluid operated mechanism is in operative position, substantially as set forth.

12. In a machine of the kind described, a work carriage, a motor for traversing said carriage, a high pressure motive fluid line connected to said motor, a by-pass valve in said line, a mechanism having hydraulic means for moving it into and out of operative position, and connections from said hydraulic means to said by-pass for causing fluid to pass from said hydraulic mechanism to said by-pass when said mechanism is in operative position, substantially as set forth.

13. A safety device for a machine tool having a work carriage, a fluid motor for traversing said carriage, a hydraulically operated mechanism, a pressure fluid supply line for operating said motor, and a by-pass valve in said supply line and operated by fluid from said mechanism for by-passing pressure fluid from said traverse motor when said mechanism is moving or is in operative position, substantially as set forth.

14. In a grinding machine having a work carriage and a wheel base movable toward and from the work carriage, a hydraulically operated mechanism movable transversely of the movement of the work carriage, means for moving the work carriage, a fluid pressure line in control of said means, and means operated by said hydraulically operated device for by passing fluid from said line to prevent operation of the work carriage when said hydraulically operated device is moving or is in operative position, substantially as set forth.

15. In a grinding machine a work carriage, a fluid motor for moving said carriage, a pressure fluid line in control of fluid to said motor, a wheel base movable toward and from the work carriage, a motor for operating said wheel base, a hydraulically operated mechanism movable in the same plane or in a plane parallel with the movement of the wheel carriage, and means controlled by said hydraulically operated device for by-passing fluid from the said fluid line to prevent operation of the work carriage when the said hydraulically operated device is actually in motion or in working position, substantially as set forth.

16. In a machine tool having a movable work support, power means for moving said support, control mechanism for said power means, a hydraulically operated mechanism movable toward and from working position, and means controlled by said hydraulic mechanism for preventing operation of said work support moving means when the hydraulically operated mechanism is moving toward or from working position or is in working position, substantially as set forth.

17. In a grinding machine, a work carriage, a hydraulic work carriage traverse mechanism, a second hydraulically operated mechanism adapted to move into and out of operative position relative to said carriage, a safety device to govern the relative movements of said carriage and said hydraulic mechanism comprising a hydraulically operated valve adapted when in one position to permit pressure fluid to reach said carriage traverse mechanism, and fluid connections from said hydraulically operated mechanism to shift said valve to permit flow of fluid to said carriage, substantially as set forth.

18. In a grinding machine, a work carriage, a hydraulic work carriage traverse mechanism, a fluid line to said mechanism, a hydraulically operated by-pass valve in said line, a second hydraulically operated mechanism movable into and out of operative position relative to said carriage, a fluid line to said last named mechanism, and fluid connections from said second mechanism to said valve, said last named fluid connections being connected to the chamber in said second mechanism which moves said mechanism to inoperative position and connected to a chamber in said valve which closes the by-pass whereby the fluid which moves said second mechanism to inoperative position to actuate said valve to close the by-pass to cause traverse of the said carriage.

19. In a grinding machine, a work carriage, hydraulic mechanism for operating said carriage, a hydraulically actuated valve biased to direct pressure fluid away from said carriage operating mechanism, a second hydraulically operated mechanism adapted to be moved toward and from said carriage, and fluid connections from said last named mechanism to said valve to shift said valve to direct fluid to said carriage driving mechanism, substantially as set forth.

20. In a grinding machine, a work carriage, hydraulic mechanism for operating said carriage, a hydraulically operated valve biased to direct pressure fluid away from said work carriage operating mechanism, another fluid operated mechanism adapted to move transversely of the work, fluid connections from said last named mechanism to said valve and adapted to shift said valve to direct pressure fluid to said carriage operating mechanism in one position of said second hydraulic mechanism, substantially as set forth.

21. In a machine tool, a pair of supports, separate fluid pressure means to move each of said supports, a fluid supply line to each of said fluid pressure means, a fluid operated by-pass valve in one of said lines adapted normally to by-pass the fluid, and means responsive to the fluid for moving one of said supports to inoperative position to shift said valve to close said by-pass to direct fluid to move the other support, substantially as set forth.

HAROLD E. BALSIGER.